US012674997B2

(12) United States Patent
Yamagishi

(10) Patent No.: US 12,674,997 B2
(45) Date of Patent: Jul. 7, 2026

(54) OPTICAL ARITHMETIC DEVICE AND PRODUCTION METHOD FOR OPTICAL ARITHMETIC DEVICE

(71) Applicant: FUJIKURA LTD., Tokyo (JP)

(72) Inventor: Hiroyuki Yamagishi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 953 days.

(21) Appl. No.: 17/797,328

(22) PCT Filed: Feb. 18, 2021

(86) PCT No.: PCT/JP2021/006061
§ 371 (c)(1),
(2) Date: Aug. 3, 2022

(87) PCT Pub. No.: WO2021/199761
PCT Pub. Date: Oct. 7, 2021

(65) Prior Publication Data
US 2023/0068974 A1 Mar. 2, 2023

(30) Foreign Application Priority Data
Mar. 31, 2020 (JP) ................................. 2020-064138

(51) Int. Cl.
G02B 27/42 (2006.01)
G02B 5/02 (2006.01)
G06E 1/00 (2006.01)

(52) U.S. Cl.
CPC ..... G02B 27/4272 (2013.01); G02B 27/4233 (2013.01); G06E 1/00 (2013.01); G02B 5/0273 (2013.01)

(58) Field of Classification Search
CPC ............ G02B 27/4272; G02B 27/4233; G02B 5/0273; G06E 1/00

USPC .......................................................... 359/576
See application file for complete search history.

(56) References Cited

U.S. PATENT DOCUMENTS 6,462,875 B1 * 10/2002 Ishii ..................... G02B 5/1876
359/9
2001/0038497 A1 11/2001 Sudoh
2010/0142053 A1 * 6/2010 Nakabayashi ....... G02B 5/1852
264/1.36

FOREIGN PATENT DOCUMENTS

| CN | 1677135 | A | 10/2005 |
| CN | 101750653 | A | 6/2010 |
| JP | H06-130444 | A | 5/1994 |
| JP | H09-127322 | A | 5/1997 |
| JP | 2000-9980 | A | 1/2000 |

(Continued)

OTHER PUBLICATIONS

English translation of International Preliminary Report on Patentability issued in corresponding International Patent Application No. PCT/JP2021/006061 dated Sep. 29, 2022 (5 pages).

(Continued)

*Primary Examiner* — Bumsuk Won
*Assistant Examiner* — Mitchell T Oestreich
(74) *Attorney, Agent, or Firm* — Osha Bergman Watanabe & Burton LLP

(57) ABSTRACT

An optical computing device includes: a light-diffraction element group including planar light-diffraction elements made of a photo-curable resin; and a tubular body that houses the light-diffraction element group and that has an inner surface to which at least a part of a perimeter of each of the planar light-diffraction elements is fixed.

14 Claims, 6 Drawing Sheets

(56)        References Cited

FOREIGN PATENT DOCUMENTS

| | | | |
|---|---|---|---|
| JP | 2000-199812 | A | 7/2000 |
| JP | 2000-338846 | A | 12/2000 |
| JP | 2004-144973 | A | 5/2004 |
| JP | 2005-316414 | A | 11/2005 |
| JP | 2010-160474 | A | 7/2010 |
| WO | 97/24645 | A1 | 7/1997 |
| WO | 2009/110311 | A1 | 9/2009 |
| WO | 2010/143454 | A1 | 12/2010 |
| WO | 2013/027340 | A1 | 2/2013 |
| WO | 2016/167761 | A1 | 10/2016 |
| WO | 2018/221091 | A1 | 12/2018 |

OTHER PUBLICATIONS

International Search Report issued in corresponding International Application No. PCT/JP2021/006061 mailed May 11, 2021 (6 pages).
Written Opinion issued in corresponding International Application No. PCT/JP2021/006061 mailed May 11, 2021 (4 pages).

\* cited by examiner

OPTICAL ARITHMETIC DEVICE AND PRODUCTION METHOD FOR OPTICAL ARITHMETIC DEVICE

TECHNICAL FIELD

The present invention relates to an optical arithmetic device (an optical computing device) including a plurality of planar light-diffraction elements. The present invention relates also to a method for producing such an optical computing device.

BACKGROUND

Patent Literature 1 discloses a technique of arranging a plurality of optical elements including lenses and filters along the optical path of input light and causing the input light to act on these optical elements in sequence.

PATENT LITERATURE

Patent Literature 1

International Publication No. WO 2013/027340

For an optical computing device in which a plurality of planar light-diffraction elements are arranged and input light is caused to act on these planar light-diffraction elements in sequence, it is important to maintain the plurality of planar light-diffraction elements in a desired positional relationship therebetween. This is because, when the planar light-diffraction elements deviate from the desired positional relationship therebetween, it is difficult to exert a desired action on the input light.

For example, there is a known planar light-diffraction element that includes a plurality of microcells each having an individually-set refractive index and that is designed to optically carry out a predetermined computation in less space and with less power consumption by causing waves of light having passed through the respective microcells to interfere with each other. In an optical computing device including such planar light-diffraction elements, even if the deviation from the positional relationship between the planar light-diffraction elements is in the order of nanometers, it could be difficult to carry out a desired optical computing.

SUMMARY

One or more embodiments of the present invention provide an optical computing device in which planar light-diffraction elements are easily maintained in a desired positional relationship therebetween.

An optical computing device in accordance with one or more embodiments of the present invention includes: a light-diffraction element group including a plurality of planar light-diffraction elements made of a photo-curable resin; and a tubular body for housing the light-diffraction element group, the tubular body having an inner surface to which at least a part of a perimeter of each of the plurality of planar light-diffraction elements of the light-diffraction element group is fixed.

A method, in accordance with one or more embodiments of the present invention, for producing an optical computing device is a method for producing the optical computing device in accordance with one or more embodiments, the method including a molding step of carrying out integral molding of the light-diffraction element group inside the tubular body.

One or more embodiments of the present invention make it possible to provide an optical computing device in which planar light-diffraction elements are easily maintained in a desired positional relationship therebetween.

DETAILED DESCRIPTION

Embodiment 1

Figure 1:
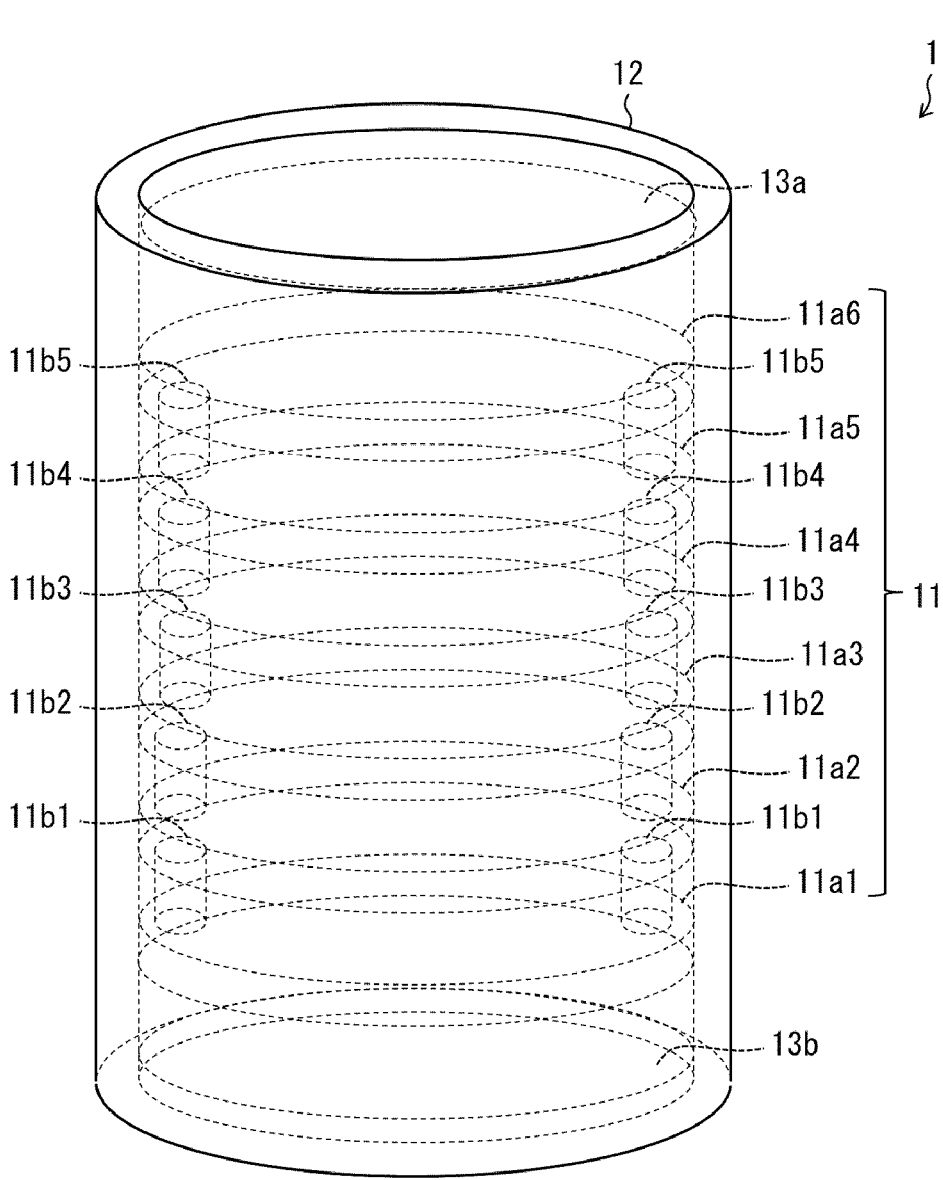
FIG. 1 is a perspective view of a configuration of an optical computing device in accordance with Embodiment 1 of the present invention.

The following description will discuss a configuration of an optical computing device 1 in accordance with one or more embodiments of the present invention, with reference to FIG. 1. FIG. 1 is a perspective view of the configuration of the optical computing device 1.

The optical computing device 1 includes: a light-diffraction element group 11; a tubular body 12; and stoppers 13a and 13b.

The light-diffraction element group 11 is a collection of N planar light-diffraction elements 11a1 to 11aN made of a photo-curable resin. Although a light-diffraction element group including six planar light-diffraction elements 11a1 to 11a6 is exemplified in FIG. 1, the number N of the planar light-diffraction elements 11a1 to 11aN is not limited to six provided that the number is any natural number not less than 2.

In Embodiment 1, each planar light-diffraction element 11ai (i is a natural number not less than 1 and not more than N) is discoid (the shape of a short, cylindrical column), and the planar light-diffraction elements 11a1 to 11aN are arranged such that the central axis of each planar light-diffraction element 11ai coincides with the central axis of any other planar light-diffraction element and the upper surface of each planar light-diffraction element 11aj (j is a natural number not less than 1 and not more than N–1) faces the lower surface of a planar light-diffraction element 11aj+1 that is adjacent to the planar light-diffraction element 11aj.

It should be noted that, in Embodiment 1, each planar light-diffraction element 11ai includes, within an active region, a plurality of microcells each having an individually-set refractive index and is designed to carry out a predetermined optical computing by causing waves of light (primarily assumed to be visible light) having passed through respective microcells to interfere with each other. In a case where such planar light-diffraction elements 11a1 to 11aN are arranged so that N times of optical computing are carried out in sequence, it is important to maintain the planar light-diffraction elements 11a1 to 11aN in a desired positional relationship therebetween. As used herein, the term "microcell" refers to a cell having a size of not more than the order of a micrometer, i.e., a cell having a size of less than 10 μm. The lower limit of the size of the microcell is not limited to any particular size, but is, for example, 1 nm.

In Embodiment 1, the light-diffraction element group 11 includes N−1 sets of columnar bodies 11b1 to 11bN−1 made of a photo-curable resin. Each columnar body 11bj is a component for connecting, to each other, planar light-diffraction elements 11aj and 11aj+1 adjacent to each other, outside the active region. This facilitates the maintenance of the planar light-diffraction elements 11a1 to 11aN in a desired positional relationship therebetween in an arrangement direction.

The tubular body 12 is a member for housing the light-diffraction element group 11. At least a part of the perimeter of each of the planar light-diffraction elements of the light-diffraction element group 11 is fixed to the inner surface of the tubular body 12. This facilitates the maintenance of the planar light-diffraction elements 11a to 11aN in a desired positional relationship therebetween in an arrangement direction. The upper end of the tubular body 12 is sealed with the stopper 13a and the lower end of the tubular body 12 is sealed with the stopper 13b. The stopper 13a is made of a transparent material that transmits light outputted from the light-diffraction element group 11. The stopper 13a may have an upper surface and a lower surface that are flat and parallel to the upper surface of the planar light-diffraction element 11a6 in order that the optical influence of the stopper 13a on the light outputted from the light-diffraction element group 11 is kept low. The stopper 13b is made of a transparent material that transmits light inputted to the light-diffraction element group 11. The stopper 13b may have an upper surface and a lower surface that are flat and parallel to the lower surface of the planar light-diffraction element 11a1 in order that the optical influence of the stopper 13b on the light inputted to the light-diffraction element group 11 is kept low.

In Embodiment 1, the tubular body 12 is cylindrical. The tubular body 12 has an inner diameter that coincides with the outer diameter of each planar light-diffraction element 11ai. It is therefore possible to fix the entire perimeter of each planar light-diffraction element 11ai to the inner surface of the tubular body 12. This allows stress to uniformly act on the entire perimeter of each planar light-diffraction element 11ai even when thermal expansion of the light-diffraction element group 11 occurs. It is therefore possible to reduce the possibility of occurrence of unexpected distortion in each planar light-diffraction element 11ai and the possibility of occurrence of change in the positional relationship between the planar light-diffraction elements 11a1 to 11aN.

The tubular body 12 may be made of a material having a greater Young's modulus than the material that the light-diffraction element group 11 is made of. This makes it possible to provide an optical computing device 1 in which the positional relationship between the planar light-diffraction elements 11a1 to 11aN is less likely to change upon action of external force, in comparison with a case where the light-diffraction element group 11 is bare without being housed in the tubular body 12.

The tubular body 12 may be made of a material having a smaller coefficient of thermal expansion than the material that the light-diffraction element group 11 is made of. This makes it possible to provide an optical computing device 1 in which the positional relationship between the planar light-diffraction elements 11a1 to 11aN is less likely to change upon a change in temperature, in comparison with a case where the light-diffraction element group 11 is bare without being housed in the tubular body 12.

The tubular body 12 may be made of a material that transmits light (e.g., ultraviolet light in a case where the photo-curable resin is an ultraviolet curable resin) used for curing the photo-curable resin which the light-diffraction element group 11 is made of. This enables formation, inside the tubular body 12, of the light-diffraction element group 11 also by applying light sideways for irradiation. Examples of the material having a greater Young's modulus than a photo-curable resin, having a smaller coefficient of thermal expansion than a photo-curable resin, and transmitting light that cures a photo-curable resin can include quartz glass.

The tubular body 12 may be filled with oil. This makes the following possible: (1) Entry of foreign matter (examples of which include water) into the tubular body 12 is made difficult; (2) Vibration of the planar light-diffraction elements 11a1 to 11aN is reduced; and (3) Deterioration (e.g., oxidation) of each planar light-diffraction element 11ai over time is reduced. In a case where the refractive index of the oil is greater than 1 and smaller than the refractive index of the planar light-diffraction element 11ai, it is further possible to (4) reduce reflection that can occur on the interface between the air and each planar light-diffraction element 11ai. Although the oil is not limited to any particular type, a silicon-based oil or a paraffin-based oil is excellent in stability and availability. Usable examples of the oil may include polymeric materials of acrylic, epoxy, vinyl, rubber, urethane, methacrylic, nylon, bisphenol, diol, polyimide, fluorinated acrylic, and fluorinated epoxies, and a combination thereof. It should be noted that the filling of the tubular body 12 with oil is optional. When a liquid or a solid having a refractive index approximately the same as that of oil is used as the filling material instead of the oil, the same effect is obtained as in a case where the oil is used for the filling. Examples of the solid used for the filling instead of oil include a photo-curable resin having a refractive index different from that of the photo-curable resin which the light-diffraction element group 11 is made of. The difference in refractive index between the material of the planar light-diffraction element 11ai and the liquid or solid with which the tubular body 12 is filled may be not less than 0.5 and not more than 1.5, in order that light having been transmitted through the cell of each planar light-diffraction element 11ai is refracted as appropriate according to the height of the cell. Alternatively, gas such as an oxygen gas or a nitrogen gas may be used as the filling material instead of oil. In a case of filling the tubular body 12 simply with the air, the stoppers 13a and 13b may be omitted.

(Specific Example of Planar Light-Diffraction Element)

Figure 2:
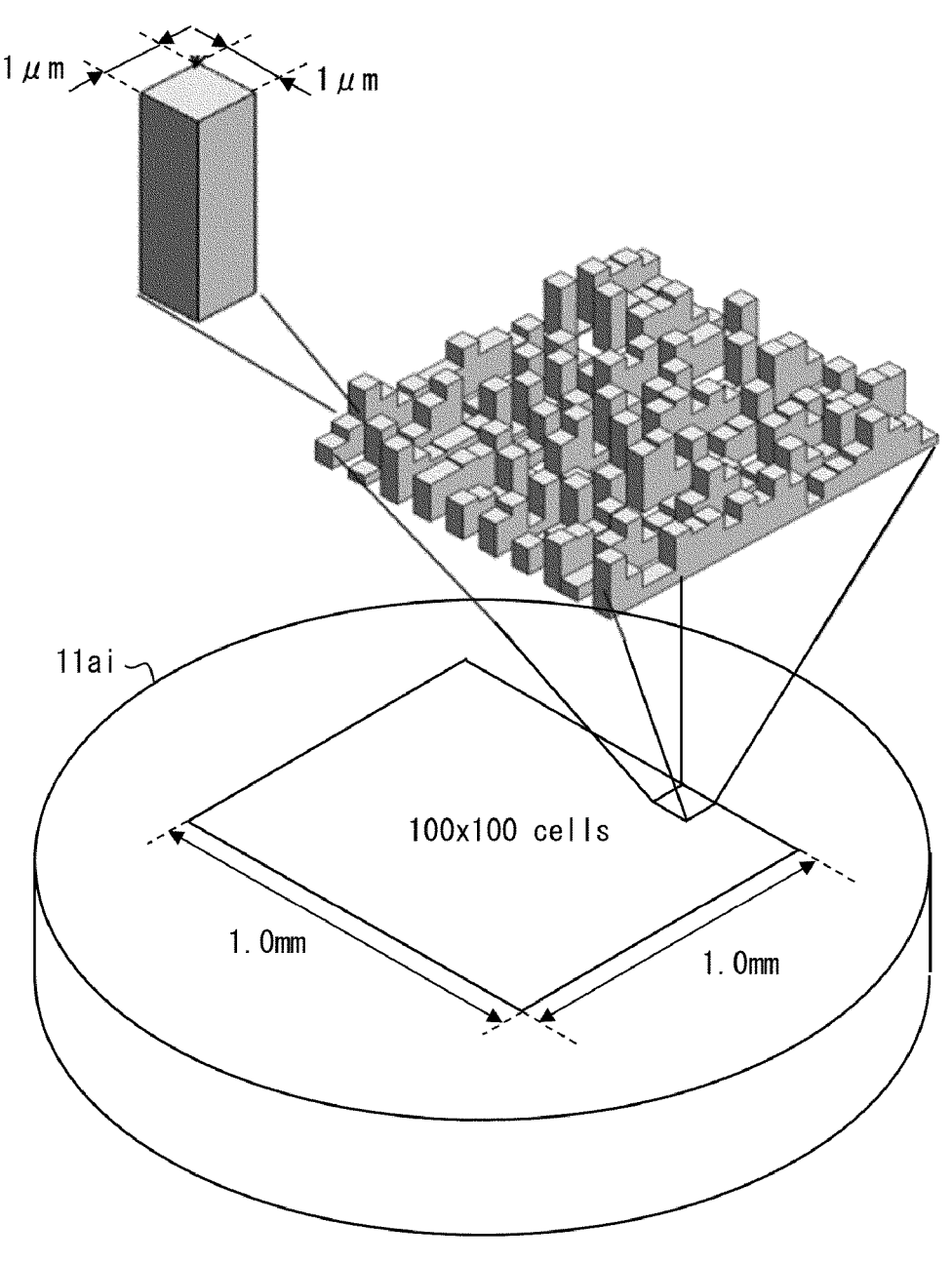
FIG. 2 is a perspective view of a specific example of a planar light-diffraction element of the optical computing device in FIG. 1.

The following description will discuss a specific example of the planar light-diffraction element 11ai of the optical computing device 1, with reference to FIG. 2. FIG. 2 is a perspective view of an active region of the planar light-diffraction element 11ai in accordance with the present specific example.

The active region of the planar light-diffraction element 11ai of the present specific example includes 100×100 microcells, each being a 1.0 mm square, arranged in a matrix form. Each of the microcells includes pillars, each having a 1 μm-square bottom, formed on a base which is 100 μm thick. The pillars have respective heights of any one of 0 nm, 100 nm, 200 nm, . . . , 1100 nm, and 1200 nm (13 levels in 100-nm intervals). The heights are determined such that a microcell including such pillars has a desired refractive index.

Although the cell size in the planar light-diffraction element 11*ai* is 1 μm in the present specific example, the cell size is not limited thereto. The cell size in the planar light-diffraction element 11*ai* only needs to be less than 10 μm. Further, the number of cells in the planar light-diffraction element 11*ai* and the size of the active region may be any number and any size.

(Variation of Light-Diffraction Element Group)

Figure 3:
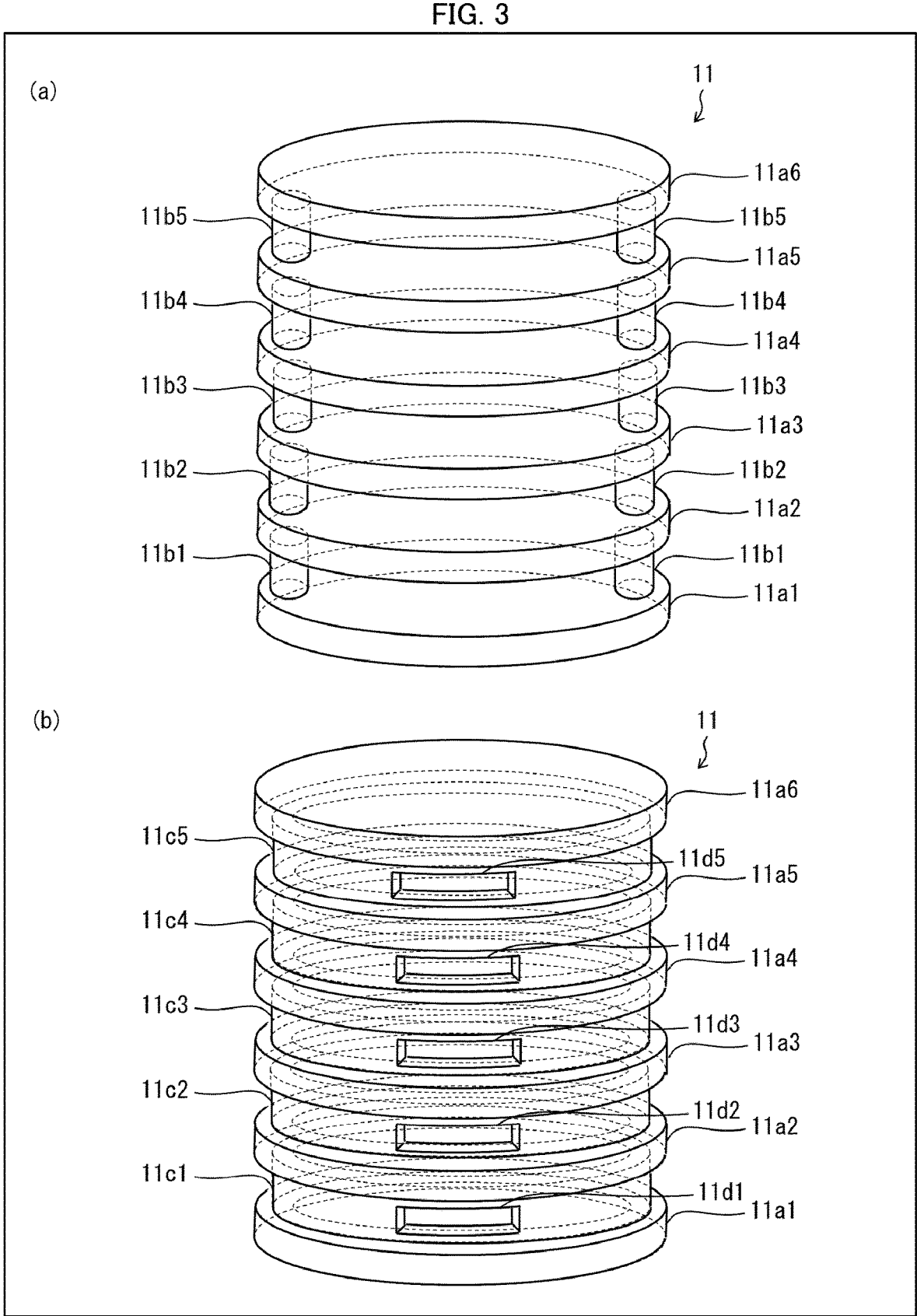
FIG. 3 is a perspective view of a variation of a light-diffraction element group of the optical computing device in FIG. 1.

As a configuration for connecting, to each other, the planar light-diffraction elements 11*aj* and 11*aj*+1 adjacent to each other, employed in Embodiment 1 are a plurality of columnar bodies 11*bi* having the shape of a cylindrical column and disposed outside the active region, as illustrated in (a) of FIG. 3. However, the present invention is not limited thereto.

For example, as the configuration for connecting, to each other, the planar light-diffraction element 11*aj* and 11*aj*+1 adjacent to each other, a single, cylindrical columnar body 11*ci* that surrounds the active region may be employed, as illustrated in (b) of FIG. 3. This configuration makes it possible to more surely maintain the positional relationship between the planar light-diffraction elements 11*aj* and 11*aj*+1 adjacent to each other. In this case, an opening 11*di* may be provided in each columnar body 11*ci*. This configuration enables discharge of an ultraviolet curable resin remaining inside the columnar body 11*ci* and injection and discharge of a cleaning liquid or a developer into and out of the columnar body 11*ci*, when the light-diffraction element group 11 is molded.

(First Method for Producing Optical Computing Device)

Figure 4:
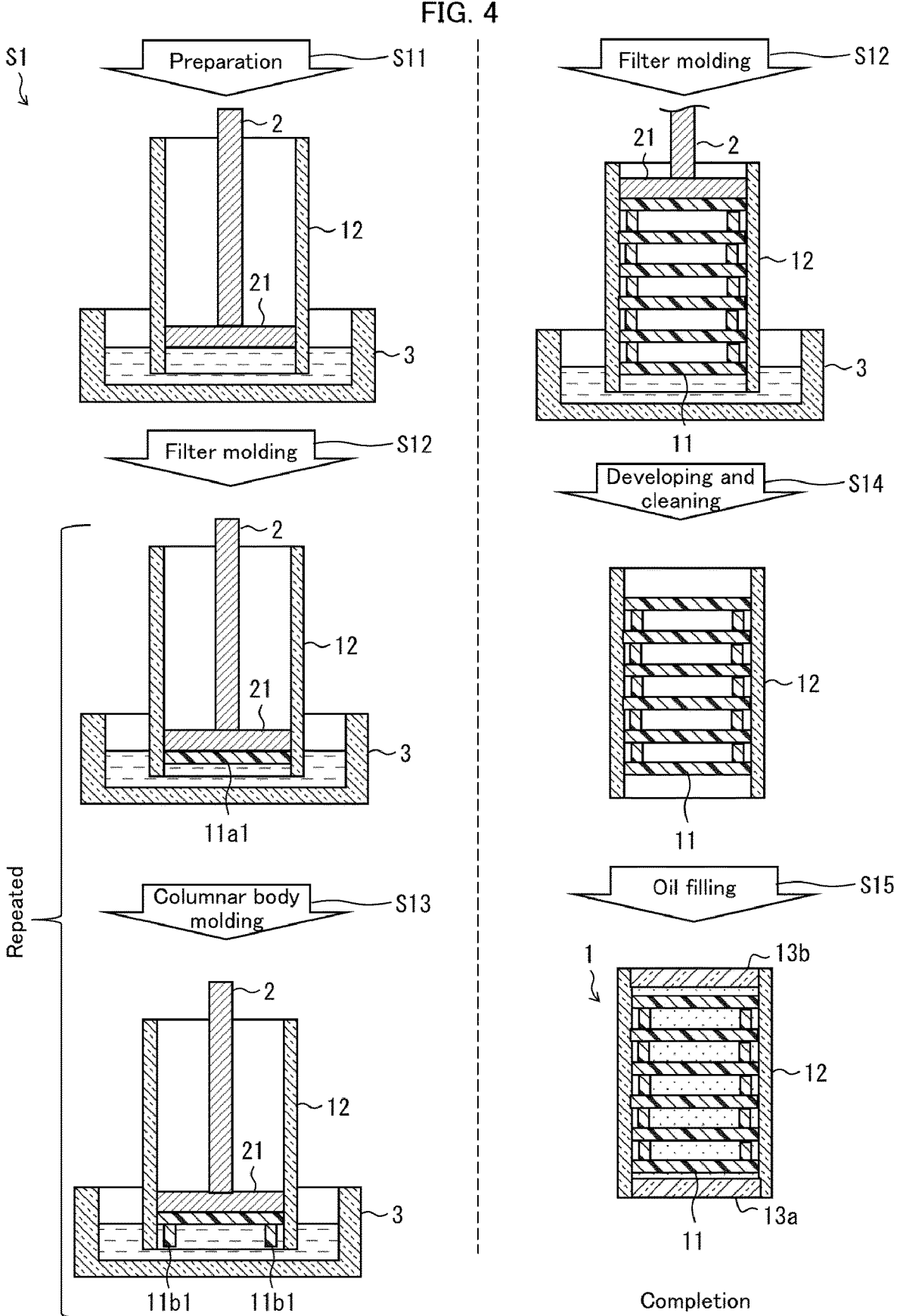
FIG. 4 is a view schematically illustrating a first method for producing a multilayer light-diffraction element 1 in FIG. 1.

The following description will discuss a first method S1 for producing the optical computing device 1, with reference to FIG. 4. FIG. 4 is a view schematically illustrating the first method S1 for producing the optical computing device 1. It should be noted that, in the first method S1 for producing the optical computing device 1, a lifting rod 2 is used which is provided with a discoid portion 21 having an outer diameter equal to or substantially equal to the inner diameter of the tubular body 12. Assume that the light-diffraction element group 11 is made of an ultraviolet curable resin.

First, a preparation step S11 is carried out. In the preparation step S11, the lifting rod 2 is inserted into the tubular body 12 from above with the discoid portion 21 facing down, and the lower end of the tubular body 12 is then immersed in an ultraviolet curable resin in an uncured state held in a small-sized pool 3 made of a material that transmits ultraviolet light.

Next, a light-diffraction element molding step S12 and a columnar body molding step S13 (an example of the "molding step" in the claims) are carried out. In the light-diffraction element molding step S12, the ultraviolet curable resin inside the tubular body 12 is irradiated with ultraviolet light applied from below the tubular body 12 while the lifting rod 2 is gradually lifted, so that the planar light-diffraction element 11*a*1 is molded. In the columnar body molding step S13, the ultraviolet curable resin inside the tubular body 12 is irradiated with ultraviolet light applied from below the tubular body 12 while the lifting rod 2 is gradually lifted, so that the columnar body 11*b*1 is molded. In the light-diffraction element molding step S12 and the columnar body molding step S13, the ultraviolet light irradiation may be carried out by stereo lithography (SLA), or may be carried out by digital light processing (DLP).

Subsequently, the light-diffraction element molding step S12 and the columnar body molding step S13 are repeated so that the light-diffraction element group 11 including the planar light-diffraction elements 11*a*2 to 11*a*N and the columnar bodies 11*b*2 to 11*b*N−1 is integrally molded. After molding of the planar light-diffraction elements 11*a*1 to 11*a*N and the columnar bodies 11*b*1 to 11*b*N−1 is completed, a fixing step of fixing the perimeter of each planar light-diffraction element 11*ai* to the inner surface of the tubular body 12 may be carried out by applying ultraviolet light from the sides of the tubular body 12 for irradiation.

Next, the discoid portion 21 is removed from the planar light-diffraction element 11*a*1, the lifting rod 2 is then pulled out of the tubular body 12, and the tubular body 12, in which the light-diffraction element group 11 is formed, is then lifted out of the pool 3. Subsequently, a developing and cleaning step S14 (an example of the "discharging step" in the claims) is carried out. In the developing and cleaning step S14, a developer is injected into the tubular body 12 for carrying out developing treatment, and a cleaning liquid is also injected into the tubular body 12 for carrying out cleaning treatment. Such developing treatment and/or cleaning treatment cause(s) an uncured ultraviolet curable resin remaining between the planar light-diffraction elements 11*aj* and 11*aj*+1 adjacent to each other to be discharged through the above-described through-hole. In a case of using an ultraviolet curable resin which does not require development, the developing treatment may be omitted.

Lastly, an oil filling step S15 is carried out. In the oil filling step S15, the tubular body 12 is filled with oil, and the upper end and the lower end of the tubular body 12 are sealed with the stoppers 13*a* and 13*b*. The optical computing device 1 is thus completed.

Each planar light-diffraction element 11*ai* may have a through-hole provided outside the active region. This facilitates discharging an uncured ultraviolet curable resin remaining between the planar light-diffraction element 11*aj* and 11*aj*+1 adjacent to each other and injecting and discharging the developer or the cleaning liquid.

According to the first production method S1, which is a method for producing the optical computing device 1, the lower end of the tubular body 12 is immersed in a photo-curable resin in an uncured state, and light is applied from below for irradiation while the light-diffraction element group 11 is lifted such that a part thereof is above the photo-curable resin upon completion of curing of the part, so that the light-diffraction element group 11 is formed inside the tubular body 12 in a sequential molding manner, as described above. Accordingly, the first production method S1 makes it possible to carry out integral molding, inside the tubular body 12, of the light-diffraction element group 11 in which the planar light-diffraction elements 11*a*1 to 11*a*N are in a desired positional relationship therebetween. According to the first production method S1, ultraviolet light is used for molding the light-diffraction element group 11. Such molding requires less time than molding of the light-diffraction element group 11 by using an electron beam. The production method S1 above eliminates the need to discard uncured ultraviolet curable resin. This enables a reduction in the cost of raw materials.

According to the first production method S1, the base and the microcells of each planar light-diffraction element 11*ai* are formed by using the same photo-curable resin. This increases the strength of bond between the microcells and the base in comparison with a case where the microcells and the base are formed by using respective materials different from each other. For example, in a case where microcells made of a photo-curable resin are formed on a base made of glass, such microcells could separate from the base when, for example, an uncured photo-curable resin is cleaned. In contrast, both the microcells and the base are integrally formed by using the same material in Embodiment 1. This results in increased strength of bond between the microcells and the base, and therefore yields an effect of the microcells being less likely to separate from the base.

Increase in the number of microcells that separate from the base causes a change in an optical path length of the diffracted light, a change in a diffraction angle, or other change, which results in a change in the properties of light. This raises the possibility of a computation accuracy reduction. In contrast, in the optical computing device 1 produced by the production method in accordance with Embodiment 1, the microcells are less likely to separate from the base. It is therefore possible to further reduce such possibility.

(Second Method for Producing Optical Computing Device)

Figure 5:
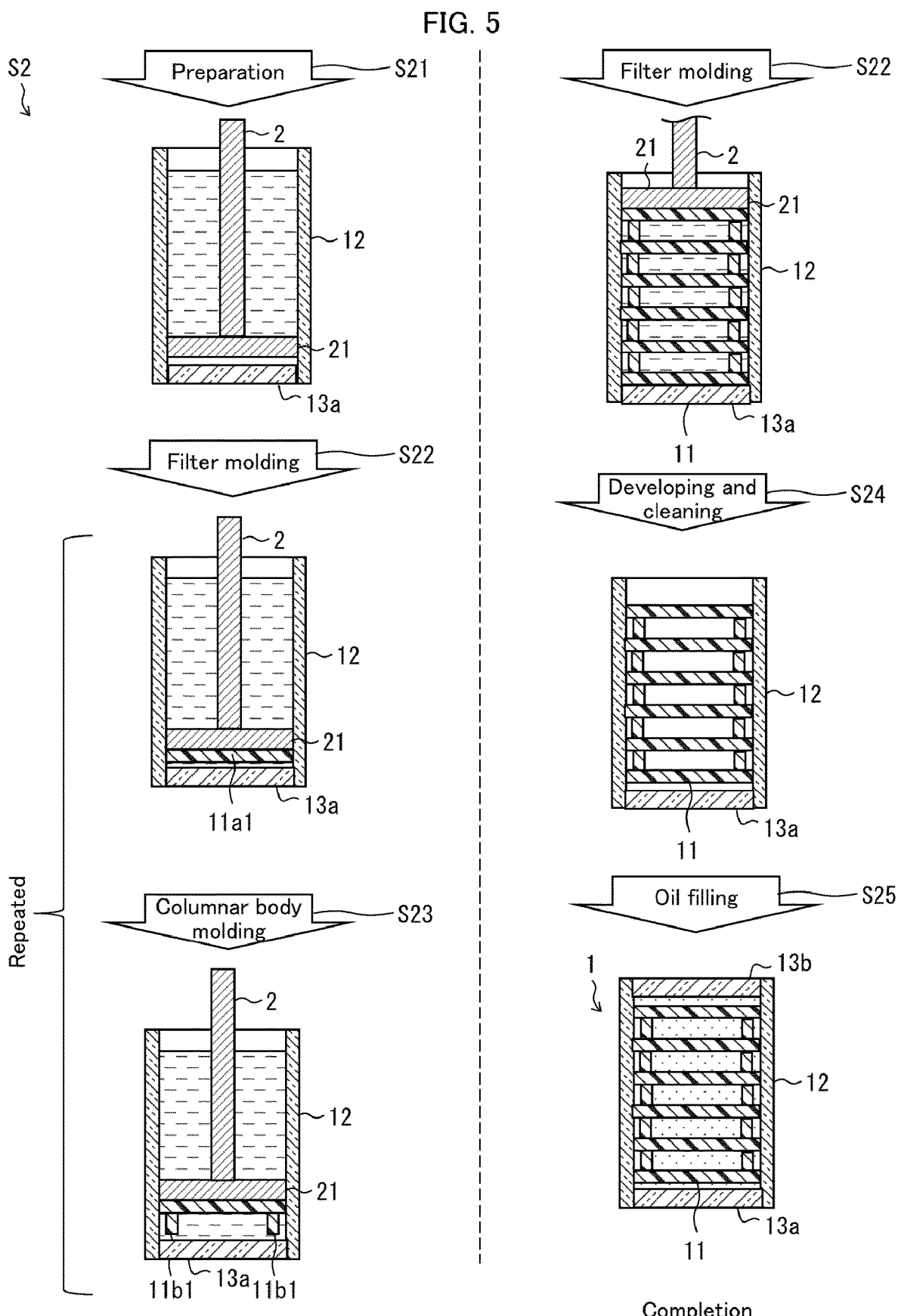
FIG. 5 is a view schematically illustrating a second method for producing the multilayer light-diffraction element 1 in FIG. 1.

The following description will discuss a second method S2 for producing the optical computing device 1, with reference to FIG. 5. FIG. 5 is a view schematically illustrating the second method S2 for producing the optical computing device 1. It should be noted that, in the second method S2 for producing the optical computing device 1, the optical computing device 1 is produced with no use of the pool 3.

First, a preparation step S21 is carried out. In the preparation step S21, the lower end of the tubular body 12 is sealed with the stopper 13a, the lifting rod 2 is inserted into the tubular body 12 from above with the discoid portion 21 facing down, and an ultraviolet curable resin is injected into the tubular body 12. The injected ultraviolet curable resin passes through a through-hole (not illustrated) vertically running through the discoid portion 21 and enters an area under the discoid portion 21.

Next, a light-diffraction element molding step S22 and a columnar body molding step S23 are carried out. In the light-diffraction element molding step S22, the ultraviolet curable resin inside the tubular body 12 is irradiated with ultraviolet light applied from below the tubular body 12 while the lifting rod 2 is gradually lifted, so that the planar light-diffraction element 11a1 is molded. In the columnar body molding step S23, the ultraviolet curable resin inside the tubular body 12 is irradiated with ultraviolet light applied from below the tubular body 12 while the lifting rod 2 is gradually lifted, so that the columnar body 11b1 is molded. In the light-diffraction element molding step S22 and the columnar body molding step S23, the ultraviolet light irradiation may be carried out by stereo lithography (SLA), or may be carried out by digital light processing (DLP).

Subsequently, the light-diffraction element molding step S22 and the columnar body molding step S23 are repeated so that the planar light-diffraction elements 11a2 to 11aN and the columnar bodies 11b2 to 11bN−1 are molded. After molding of the planar light-diffraction elements 11a1 to 11aN and the columnar bodies 11b1 to 11bN−1 is completed, the perimeter of each planar light-diffraction element 11ai may be fixed to the inner surface of the tubular body 12 by applying ultraviolet light from the sides of the tubular body 12 for irradiation.

Next, the discoid portion 21 is removed from the planar light-diffraction element 11a1, the lifting rod 2 is then pulled out of the tubular body 12, and an ultraviolet curable resin remaining inside the tubular body 12 is discharged. Subsequently, a developing and cleaning step S24 is carried out. In the developing and cleaning step S24, a developer is injected into the tubular body 12 for carrying out developing treatment, and a cleaning liquid is also injected into the tubular body 12 for carrying out cleaning treatment. In a case of using an ultraviolet curable resin which does not require development, the developing treatment may be omitted.

Lastly, an oil filling step S25 is carried out. In the oil filling step S25, the tubular body 12 is filled with oil, and the upper end of the tubular body 12 is sealed with the stopper 13b. The optical computing device 1 is thus completed.

The second production method S2 enables production of the optical computing device 1 by using a smaller amount of an ultraviolet curable resin than the first production method S1. The second production method S2 therefore makes it possible to further reduce the cost of raw materials in comparison with the first production method S1.

The base and the microcells are integrally formed by using the same material also in the second production method S2. This yields an effect of the microcells being less likely to separate from the base.

Embodiment 2

The following description will discuss an optical computing device 1A in accordance with Embodiment 2 of the present invention with reference to drawings. Components that are the same as those in the optical computing device 1 in accordance with Embodiment 1 are assigned the same reference signs, and the descriptions thereof are omitted. Incoming light that enters the optical computing device 1A is infrared light (in particular, near-infrared light). The reason for using near-infrared light as the incoming light is described first.

The incoming light having been entered the optical computing device 1A forms an image on an image plane at a predetermined distance from the last planar light-diffraction element 11a6. This distance to the image plane from the last planar light-diffraction element 11a6 is a numerical value given in multiples of the wavelength of the incoming light. Further, the light entering each planar light-diffraction element 11ai needs to be collimated. Therefore, the distance to the image plane located at a distance in multiples of the wavelength may be as shorter as possible, in consideration of divergence of light with the divergence angle of light. However, a shorter distance to the image plane makes the production including positional alignment difficult. In consideration of the above conditions, light entering the optical computing device 1A may have a longer wavelength as possible. For example, infrared light rather than visible light may be used. This is the reason for using infrared light as the light entering the optical computing device 1A.

Figure 6:
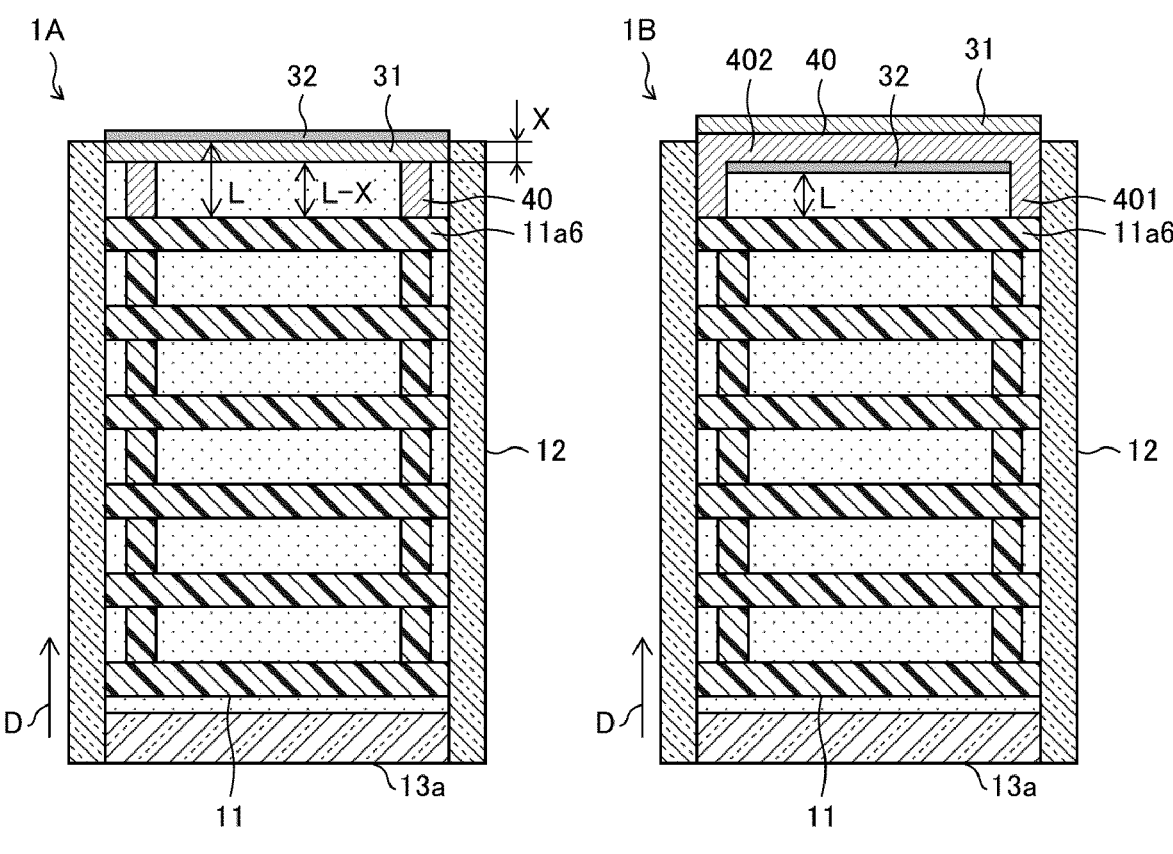
FIG. 6 is a cross-sectional view of a configuration of an optical computing device in accordance with Embodiment 2 of the present invention.

FIG. 6 is a cross-sectional view of a configuration of the optical computing device 1A in accordance with Embodiment 2 of the present invention. Instead of the stopper 13b at the exit of light from the optical computing device 1 in accordance with Embodiment 1, the optical computing device 1A includes: a light conversion layer 31; a light diffusion layer 32; and a spacer 40. The other components are the same as those of the optical computing device 1.

The light conversion layer 31 and the light diffusion layer 32 are discoid members that are provided to be substantially orthogonal to a direction in which the infrared light enters. The light conversion layer 31 and the light diffusion layer 32 are not limited to any particular shape, but have a shape that conforms to the shape of the planar light-diffraction element 11ai in Embodiment 2. The spacer 40 is a member for supporting the light conversion layer 31 and the light diffusion layer 32 in the outer circumferential part of the layers. In FIG. 6, the direction in which the infrared light enters is indicated by an arrow D.

The light conversion layer 31 is a layer for converting the infrared light into visible light by making the wavelength of the infrared light shorter, and is disposed in the last stage of the optical computing device 1A. The last stage means a stage in which light having entered the optical computing device 1A exits, and is a stage downstream of the planar light-diffraction element 11a6 in Embodiment 2. The light conversion layer 31 converts an outgoing infrared light that exits from the planar light-diffraction element 11a6 into visible light.

There is a known method for forming the light conversion layer 31 by, for example, subjecting nanoparticles to surface modification. Usable examples of the nanoparticles include nanosized particles of a dielectric such as an inorganic fluoride or an inorganic oxide having a surface doped with rare-earth ions. Alternatively, the light conversion layer 31 may be formed by, for example, a method of complex formation of an organic dye in rare-earth ions. This method yields relatively high conversion efficiency of converting infrared light into visible light.

The optical computing device 1A includes the light conversion layer 31 for the following reason. High-precision cameras that capture infrared light for imaging need to include an imaging device in which, for example, an InGaAs sensor is used. Such cameras are expensive. Instead of using such cameras, conceived of is a method in which infrared light is used as the light transmitting through the optical computing device 1A, and the infrared light having been transmitted through the optical computing device 1A is converted into visible light, which is then captured by a visible light camera for imaging. Visible light can be captured, for imaging, by using an inexpensive CMOS sensor for visible light or the like. The light conversion layer 31 is a wavelength converting element for making it possible for a camera for visible light to detect light exiting from the optical computing device 1A.

The light having been transmitted through the planar light-diffraction element 11a6 (hereinafter, also referred to as transmitted light) is captured by a camera for imaging, for example, after passing through a lens. This transmitted light contains components of various travelling directions. Some of the components are not allowed to pass through the lens. For this reason, a diffusion layer 32 may be used to change the directions of the components of the transmitted light that are not allowed to pass through the lens to increase components that are allowed to enter the camera (corresponding to a reduction in numerical aperture of the transmitted light or an increase in effective numerical aperture of the lens). The diffusion layer 32 therefore has a function of diffusing visible light generated at the light conversion layer 31 to increase components that are allowed to pass through the lens and thereby leading more light to the camera. In other words, the diffusion layer 32 makes it possible to avoid physical constraints associated with the lens. The diffusion layer 32 is not limited to any configuration provided that the diffusion layer has a function of diffusing light, but is, for example, a quartz plate whose one side is a roughened surface. Examples of a method for roughening the surface of the quartz plate include a mechanical method by sandblasting or the like and a chemical method of applying an etchant. In terms of the degree of the roughening, when the roughening is performed by, for example, distributing particulates on the surface, the particulates may have a grain size of approximately 80 to 250. Further, the angle of diffusion of light may be between 10° and 80°, and may be as wide as angles between 60° and 80°. Note that deep roughening causes light to diffuse in a depth direction (the travelling direction of the light) and thereby causes an image to be blurred. Therefore, the roughening may be performed only on the surface of quartz plate. In other words, the layer having a diffusing function may be thin.

The spacer 40 defines a distance L to the diffusion layer 32 from the last planar light-diffraction element 11a6 of the optical computing device 1A. To be exact, the distance L is a distance to the diffusion layer 32 from the highest position of the microcells of the planar light-diffraction element 11a6. However, the heights of the microcells, which are at most approximately 1200 nm (1.2 $\mu$m), are negligible. For example, in a case where the light conversion layer 31 has a thickness of x, the height (the length in the travelling direction of the infrared light) of the spacer 40 is set to (L−x). Specifically, in a case where the incoming infrared light is near-infrared light whose wavelength is 1550 nm, the distance L can be set to, for example, 60 $\mu$m. It is possible to precisely define the distance L from the planar light-diffraction element 11a6 to the diffusion layer 32 by, for example, disposing, on the planar light-diffraction element 11a6, the spacer 40 (having a height of L−x) produced as a separate body and disposing, on the spacer 40, the light conversion layer 31 (having a thickness of x) and the diffusion layer 32 in sequence. The spacer 40 may be composed of columnar bodies which are similar to the columnar body 11bi and which are arranged in a ring shape. Alternatively, the spacer 40 may be formed into an annular shape.

For the optical computing device 1A described above, the light conversion layer 31 is located on the light entry side and the diffusion layer 32 is located on the light exit side. However, the order in which the light conversion layer 31 and the diffusion layer 32 are located is not limited thereto, but may be reversed (not illustrated). In a case of the reverse order, infrared light exiting from the planar light-diffraction element 11a6 enters the diffusion layer 32 first, the infrared light is diffused, and the infrared light having been diffused enters the light conversion layer 31 and is then converted into visible light.

(Production Method)

The following description will discuss a method for producing the optical computing device 1A. Up to the developing and cleaning step S14, the method for producing the optical computing device 1A is the same as the first method S1 for producing the optical computing device 1. After the step, the spacer 40 is formed, and the light conversion layer 31 and the diffusion layer 32 produced in advance are layered in this order on the spacer 40. The spacer 40 may be formed on the planar light-diffraction element 11a6 by using an ultraviolet curable resin, by the same method that the columnar body 11bi is produced. When the spacer 40 is produced by the same production method that the columnar body 11bi is produced, it is possible to further improve dimensional precision of the distance L.

Alternatively, the spacer 40, the light conversion layer 31, and the diffusion layer 32 are layered in this order to form a light conversion unit in an advance production, and the light conversion unit may be placed on the planar light-diffraction element 11a6 after the developing and cleaning step S14 of the production method S1.

(Variation 1)

For the optical computing device 1A, the spacer 40, the light conversion layer 31, and the diffusion layer 32 are components separate from each other. However, as illustrated in an optical computing device 1B in FIG. 6, the spacer 40 may be united with the diffusion layer 32 to form an integral component so that the distance L is defined as precisely in dimension as possible.

The optical computing device 1B includes: a spacer 40; and a light conversion layer 31. The spacer 40 includes: a leg portion 401 provided in the outer circumferential part of the spacer 40 and in the light entry direction; and a discoid plate portion 402. A diffusion layer 32 is formed on the light entry-side surface of the plate portion 402. The light conversion layer 31 is layered on the light exit-side surface of the plate portion 402. The leg portion 401 defines a distance L between the planar light-diffraction element 11a6 and the diffusion layer 32. The leg portion 401 therefore has a height (the length in the entry direction of the light) of L. The order in which the light conversion layer 31 and the diffusion layer 32 are located may be reversed, also in Variation 1.

The spacer 40 is made of, for example, quartz, and the diffusion layer 32 is formed by roughening the light entry-side surface of the plate portion 402. The spacer 40, which is quartz, enables formation of the leg portion 401 such that the height L is defined precisely in dimension. Accordingly, a part of the spacer 40 forming the diffusion layer 32 enables definition, with dimensional precision, of the distance L between the planar light-diffraction element 11a6 and the diffusion layer 32.

In the method for producing the optical computing device 1B, the spacer 40 and the light conversion layer 31 that are produced in advance may be disposed on the planar light-diffraction element 11a6 after the developing and cleaning step S14 of the first method S1 for producing the optical computing device 1.

(Variation 2)

In the optical computing devices 1A and 1B, the diffusion layer 32 does not need to be formed on the entire surface of the discoid member. The diffusion layer 32 needs to be formed at least over a range of entry of outgoing light from the microcells of the planar light-diffraction element 11a6. Outside the range of entry of the outgoing light from the microcells, an alignment mark for positional alignment may be provided without the diffusion layer 32 being formed. For example, for the optical computing device 1B, the alignment mark may be provided on the bottom surface of the leg portion 401. Providing an alignment mark in a region in which the diffusion layer 32 is not provided facilitates positional alignment with the aid of the alignment mark.

(Additional Remarks)

The present invention is not limited to the above embodiments, but can be altered by a person skilled in the art within the scope of the claims. The present invention also encompasses, in its technical scope, any embodiments derived by combining technical means disclosed in differing embodiments.

As used herein, the term "light-diffraction element" refers to an element for converting a light signal representing some information (e.g., some image) into a light signal representing different information (e.g., a different image). Accordingly, by analogy with referring to an element for converting an electrical signal representing some image into an electrical signal representing a different image as a filter, the term "light-diffraction element" herein can be interchangeable with the term "optical filter". As used herein, the "optical computing device" is a device for carrying out optical computing by using a light-diffraction element, i.e., an optical filter. Accordingly, the term "optical computing device" herein can be interchangeable with the term "multilayer optical filter device".

(Main Points)

An optical computing device in accordance with one or more embodiments of the present invention includes: a light-diffraction element group including a plurality of planar light-diffraction elements made of a photo-curable resin; and a tubular body for housing the light-diffraction element group, the tubular body having an inner surface to which at least a part of a perimeter of each of the plurality of planar light-diffraction elements of the light-diffraction element group is fixed.

The above configuration facilitates maintenance of the planar light-diffraction elements in a desired positional relationship therebetween.

Employed in an optical computing device in accordance with one or more embodiments of the present invention, in addition to the configuration of the embodiments described above, is a configuration in which the tubular body is filled with a liquid or a solid for the purpose of maintaining consistency in refractive index.

With the above configuration, it is possible to make difficult entry of foreign matter (examples of which include water) into the tubular body. Alternatively, it is possible to reduce vibration of the planar light-diffraction elements. Alternatively, it is possible to reduce deterioration (e.g., oxidation) of each planar light-diffraction element.

Employed in an optical computing device in accordance with one or more embodiments of the present invention, in addition to the configuration of the embodiments described above, is a configuration in which the liquid or the solid has a refractive index greater than 1 and smaller than a refractive index of the plurality of planar light-diffraction elements.

The above configuration enables a reduction in reflection that can occur on the interface between the air and each planar light-diffraction element.

Employed in an optical computing device in accordance with one or more embodiments of the present invention, in addition to any one of the configurations of the embodiments described above, is a configuration in which the tubular body has a greater Young's modulus than the light-diffraction element group.

The above configuration makes it possible to provide an optical computing device in which the positional relationship between the planar light-diffraction elements is less likely to change upon action of external force, in comparison with a case where the light-diffraction element group is bare without being housed in the tubular body.

Employed in an optical computing device in accordance with one or more embodiments of the present invention, in addition to any one of the configurations of the embodiments described above, is a configuration in which the tubular body has a smaller coefficient of thermal expansion than the plurality of planar light-diffraction elements.

The above configuration makes it possible to provide an optical computing device in which the positional relationship between the planar light-diffraction elements is less likely to change upon a change in temperature, in comparison with a case where the light-diffraction element group is bare without being housed in the tubular body.

Employed in an optical computing device in accordance with one or more embodiments of the present invention, in addition to any one of the configurations of the embodiments described above, is a configuration in which the tubular body transmits light for curing the photo-curable resin.

The above configuration enables formation, inside the tubular body, of the light-diffraction element group also by applying light sideways for irradiation. Further, applying light sideways for irradiation makes it easy to fix the perimeter of each planar light-diffraction element to the inner surface of the tubular body.

Employed in an optical computing device in accordance with one or more embodiments of the present invention, in addition to any one of the configurations of the embodiments described above, is a configuration in which the plurality of planar light-diffraction elements of the light-diffraction element group are each discoid and the tubular body is cylindrical.

The above configuration allows stress to uniformly act on the entire perimeter of each planar light-diffraction element even when thermal expansion of the light-diffraction element group occurs. It is therefore possible to reduce the possibility of occurrence of unexpected distortion in each planar light-diffraction element and the possibility of occurrence of change in the positional relationship between the planar light-diffraction elements.

Employed in an optical computing device in accordance with one or more embodiments of the present invention, in addition to any one of the configurations of the embodiments described above, is a configuration in which two planar light-diffraction elements of the light-diffraction element group that are adjacent to each other are connected to each other by a columnar body made of the photo-curable resin.

The above configuration facilitates maintenance of the planar light-diffraction elements in a desired positional relationship therebetween in an arrangement direction, i.e., the maintenance of an interval between the planar light-diffraction elements adjacent to each other at a desired value.

Employed in an optical computing device in accordance with one or more embodiments of the present invention, in addition to any one of the configurations of the embodiments described above, is a configuration in which the light-diffraction element group includes at least one planar light-diffraction element including a plurality of microcells each having an individually-set refractive index.

The above configuration makes it possible to provide an optical computing device capable of carrying out multistage optical computing.

Employed in an optical computing device in accordance with one or more embodiments of the present invention, in addition to any one of the configurations of the embodiments described above, is a configuration in which the optical computing device includes, downstream of a last planar light-diffraction element of the plurality of planar light-diffraction elements, a light conversion layer for converting infrared light into visible light.

The above configuration enables conversion of infrared light included in outgoing light from the optical computing device into visible light and therefore enables detection of exiting light by using an imaging device for visible light.

Employed in an optical computing device in accordance with one or more embodiments of the present invention, in addition to the configuration of the embodiments described above, is a configuration in which the optical computing device further includes, downstream of the planar light-diffraction element in the last stage, a diffusion layer for diffusing the infrared light or the visible light.

The above configuration enables an improvement in the efficiency of converting light at the light conversion layer.

Employed in an optical computing device in accordance with one or more embodiments of the present invention, in addition to the configuration of the embodiments described above, is a configuration in which the optical computing device further includes a spacer for defining a distance from the planar light-diffraction element in the last stage to the diffusion layer.

The above configuration makes it possible to define, precisely in dimension, the distance from the planar light-diffraction element in the last stage to the diffusion layer.

An optical computing device production method in accordance with one or more embodiments of the present invention is a method for producing the optical computing device in accordance with any of the embodiments described above, the method including a molding step of carrying out integral molding of the light-diffraction element group inside the tubular body.

With the above method, the light-diffraction element group is integrally molded inside the tubular body. This makes it possible to easily produce an optical computing device in which the planar light-diffraction elements are in a desired positional relationship therebetween.

An optical computing device production method in accordance with one or more embodiments of the present invention is included in the optical computing device production method in accordance with the embodiments described above. According to the method of one or more embodiments, a lower end of the tubular body is immersed in a photo-curable resin in an uncured state or an uncured resin is injected into the tubular body whose lower end is sealed, and light is applied from below for irradiation while the light-diffraction element group is lifted such that a part thereof is above the photo-curable resin upon completion of curing of the part, so that the light-diffraction element group is formed inside the tubular body in a sequential molding manner. It should be noted that two planar light-diffraction elements of the light-diffraction element group that are adjacent to each other are connected to each other by a columnar body made of the photo-curable resin.

According to the above method, light (e.g., ultraviolet light) is used for molding the light-diffraction element group. Such molding requires less time than molding of the light-diffraction element group by using an electron beam. With the above method, it is possible to mold the light-diffraction element group by using a small amount of ultraviolet curable resin injected into a small-sized pool or a tubular body. This enables a reduction in the cost of raw materials.

An optical computing device production method in accordance with one or more embodiments of the present invention is included in the optical computing device production method in accordance with the embodiments described above, and further includes a fixing step of fixing at least a part of the perimeter of each of the planar light-diffraction elements of the light-diffraction element group to an inner surface of the tubular body, by applying light sideways through the tubular body for irradiation after the molding step. Note that the tubular body transmits light for curing the photo-curable resin.

The above method makes it possible to fix at least a part of the perimeter of each of the planar light-diffraction elements of the light-diffraction element group more firmly to the inner surface of the tubular body.

An optical computing device production method in accordance with one or more embodiments of the present invention is included in the optical computing device production method in accordance with any of the embodiments described above, the method further including a discharging step of discharging a photo-curable resin remaining between two planar light-diffraction elements of the light-diffraction element group that are adjacent to each other, by performing one or both of developing treatment and cleaning treatment after the molding step, the developing treatment being carried out with a developer being injected into the tubular body, the cleaning treatment being carried out with a cleaning liquid being injected into the tubular body. Note that each planar light-diffraction element of the light-diffraction element group is provided with a through-hole.

The above method makes it possible to more surely discharge the photo-curable resin remaining between two planar light-diffraction elements adjacent to each other.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical computing device
11: Light-diffraction element group
11a1 to 11a6: Planar light-diffraction element
11b1 to 11b5: Columnar body (shape of cylindrical column)
11c1 to 11c5: Columnar body (cylindrical)
12: Tubular body
13a, 13c: Stopper
31: Light conversion layer
32: Diffusion layer
40: Spacer
401: Leg portion
402: Plate portion

The invention claimed is:

1. An optical computing device comprising:
a light-diffraction element group comprising planar light-diffraction elements made of a photo-curable resin; and
a tubular body that houses the light-diffraction element group and that has an inner surface to which at least a part of a perimeter of each of the planar light-diffraction elements is fixed, wherein
a columnar body made of the photo-curable resin connects a first planar light-diffraction element of the light-diffraction element group to a second planar light diffraction element of the light-diffraction element group that is adjacent to the first planar light-diffraction element.

2. An optical computing device comprising:
a light-diffraction element group comprising planar light-diffraction elements made of a photo-curable resin;
a tubular body that houses the light-diffraction element group and that has an inner surface to which at least a part of a perimeter of each of the planar light-diffraction elements is fixed; and
a light conversion layer that converts infrared light into visible light downstream of a last planar light-diffraction element of the planar light-diffraction elements.

3. The optical computing device according to claim 2, further comprising a diffusion layer that diffuses the infrared light to the visible light downstream of the last planar light-diffraction element.

4. The optical computing device according to claim 3, further comprising a spacer that defines a distance from the last planar light-diffraction element to the diffusion layer.

5. A method for producing an optical computing device comprising: a light-diffraction element group comprising planar light-diffraction elements made of a photo-curable resin;
and a tubular body that houses the light-diffraction element group and that has an inner surface to which at least a part of a perimeter of each of the planar light-diffraction elements is fixed, the method comprising
molding integrally the light-diffraction element group inside the tubular body, wherein
a columnar body made of the photo-curable resin connects a first planar light-diffraction element of the light-diffraction element group to a second planar light diffraction element of the light-diffraction element group that is adjacent to the first planar light-diffraction element, and
the molding comprises forming the light-diffraction element group inside the tubular body in a sequential molding manner by:
either one of:
immersing a lower end of the tubular body in a photo-curable resin in an uncured state, or
injecting an uncured resin into the tubular body whose lower end is sealed; and
applying light from below for irradiation while the light-diffraction element group is lifted such that a part thereof is above the photo-curable resin upon completion of curing of the part.

6. The method according to claim 5, wherein
the tubular body transmits light for curing the photo-curable resin, and
the method further comprises fixing at least a part of a perimeter of each of the planar light-diffraction elements to an inner surface of the tubular body by applying light sideways through the tubular body for irradiation after the molding.

7. The method according to claim 5, wherein
the planar light-diffraction elements each comprise a through-hole,
the method further comprises discharging a photo-curable resin remaining between two planar light-diffraction elements that are adjacent by one or both of developing treatment and cleaning treatment after the molding,
in the developing treatment, a developer is injected into the tubular body, and
in the cleaning treatment, a cleaning liquid is injected into the tubular body.

8. The optical computing device according to claim 1, wherein the tubular body is filled with a liquid or a solid.

9. The optical computing device according to claim 8, wherein the liquid or the solid has a refractive index greater than 1 and smaller than a refractive index of the planar light-diffraction elements.

10. The optical computing device according to claim 1, wherein the tubular body has a greater Young's modulus than the light-diffraction element group has.

11. The optical computing device according to claim 1, wherein the tubular body has a smaller coefficient of thermal expansion than the planar light-diffraction elements have.

12. The optical computing device according to claim 1, wherein the tubular body transmits light for curing the photo-curable resin.

13. The optical computing device according to claim 1, wherein
the planar light-diffraction elements are each discoid, and
the tubular body is cylindrical.

14. The optical computing device according to claim 1, wherein the light-diffraction element group comprises one planar light-diffraction element comprising microcells each having an individually-set refractive index.

* * * * *